Sept. 1, 1953          G. W. NIGH          2,650,713
TENSIONING APPARATUS
Filed March 1, 1950                                 2 Sheets-Sheet 1
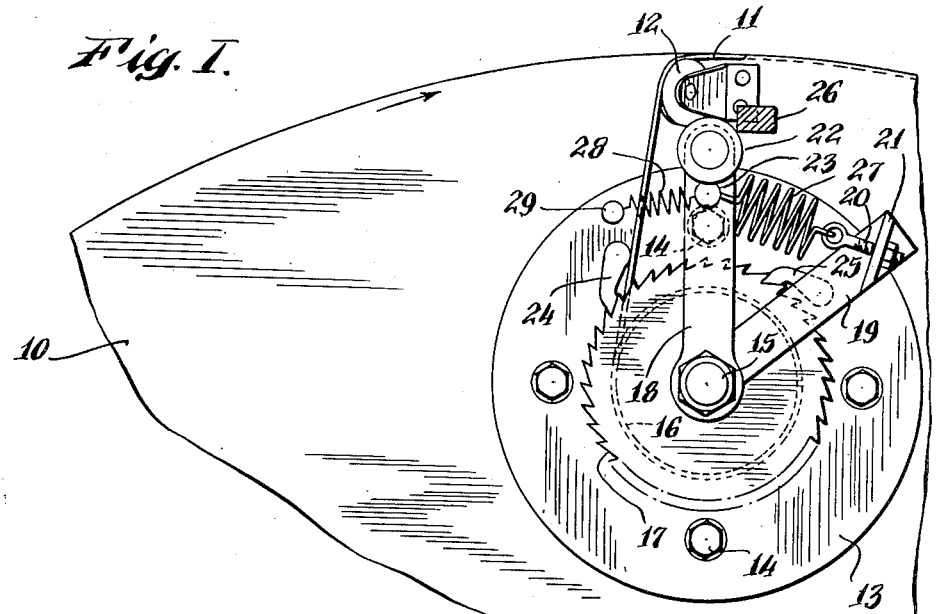
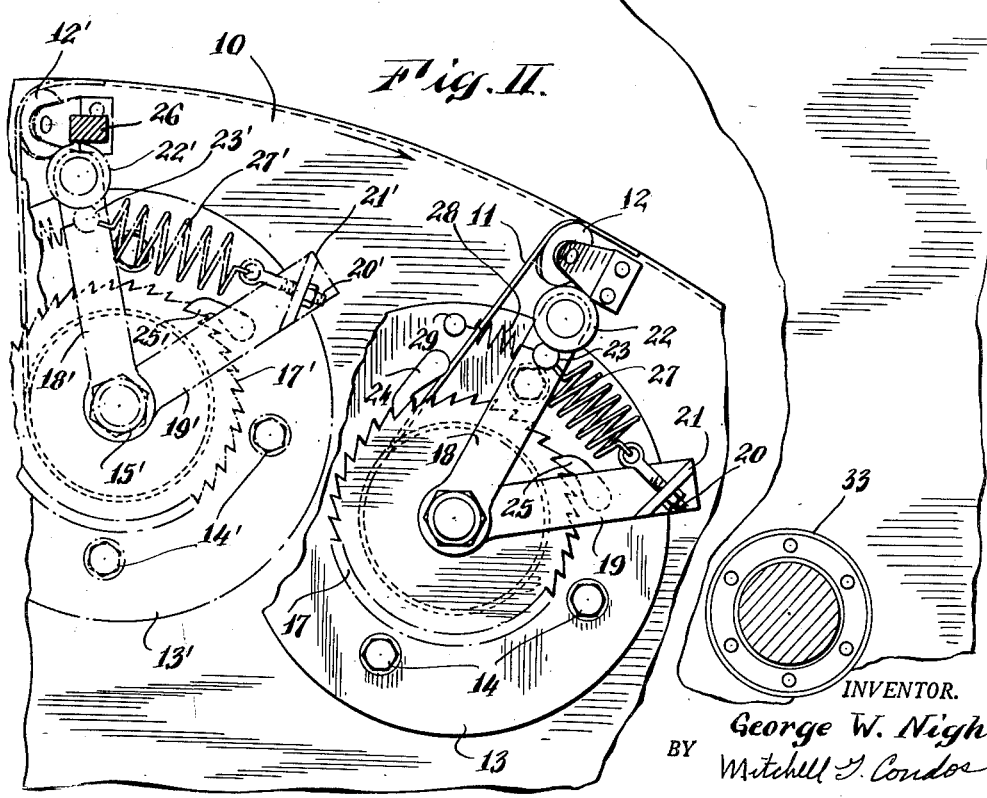
INVENTOR.
George W. Nigh
BY Mitchell T. Condos
ATTORNEY.

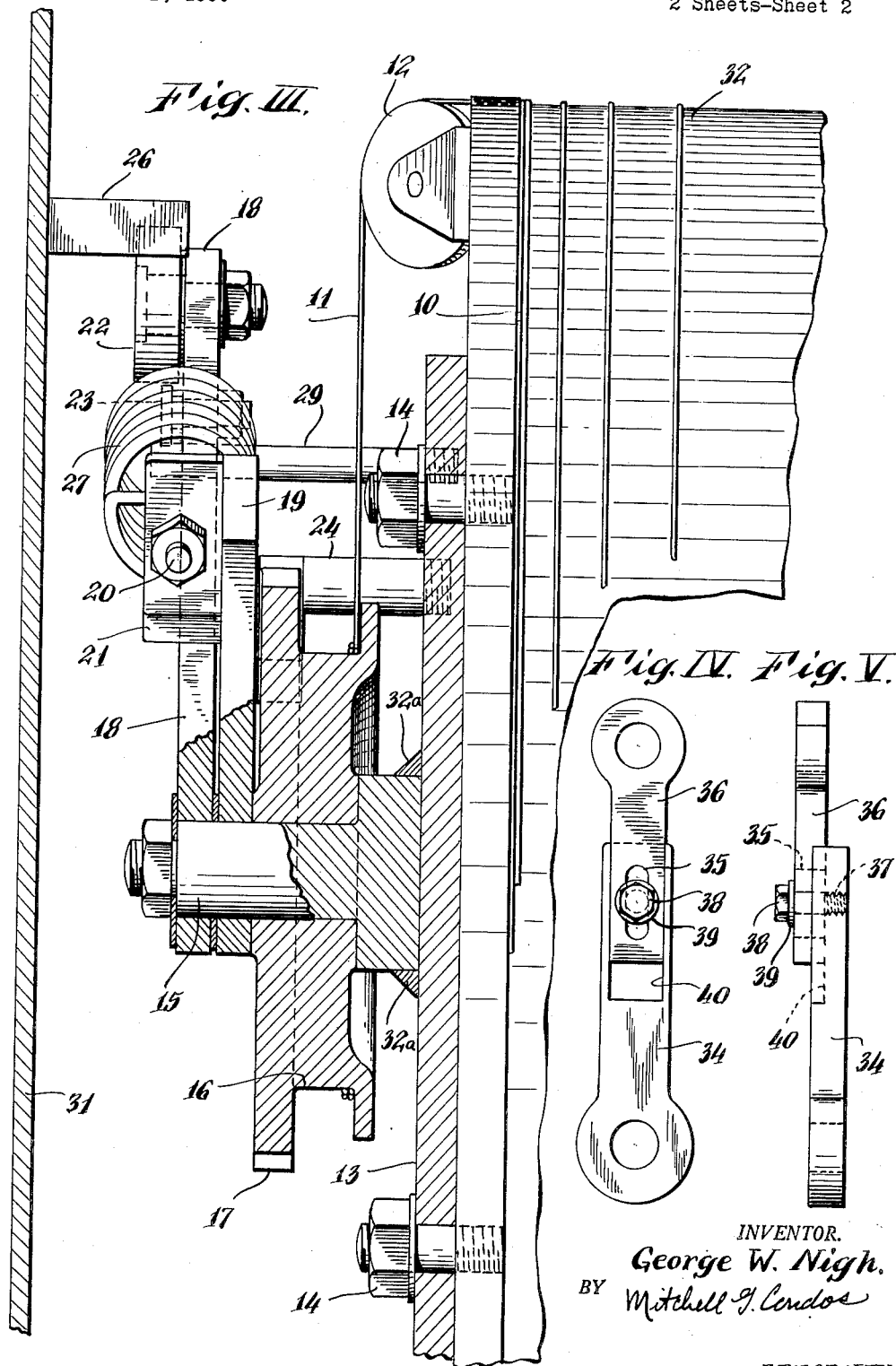

Patented Sept. 1, 1953

2,650,713

UNITED STATES PATENT OFFICE 2,650,713

TENSIONING APPARATUS

George W. Nigh, Bayonne, N. J., assignor to Tide Water Associated Oil Company, Bayonne, N. J., a corporation of Delaware Application March 1, 1950, Serial No. 146,957

8 Claims. (Cl. 210—199)

The present invention relates to an improved device adaptable for automatically providing desired tension on wire, cable, cord or the like subject to stretching or elongation and, in particular, for maintaining desired tension on windings employed on cylindrical drums.

As those skilled in the art are aware, extensive usage is made in industrial practice of equipment and apparatus equipped with wire, cable, cord or the like means having a tendency to stretch or elongate and, for which apparatus and equipment, continued satisfactory operation depends considerably upon maintenance of such means under desired tension. As an illustration thereof, the art is aware of filtering apparatus of the cylindrical drum type widely used in the petroleum, paper, and other industries and particularly for filtration purposes to separate solids such as wax, pulp, fibers, etc., from liquids. In such apparatus, the cylindrical peripheral portion of the drum is usually wound with a wire-fastening means that tends to stretch or elongate in operation and gives rise to considerable trouble and expense in operation and maintenance of the apparatus despite the fact that such apparatus may be equipped with conventional means for maintaining the wire under tension. Although the novel device embodied herein has utility for maintaining desired tension on wirings other than those used on apparatus of the cylindrical drum type, rotary drum filters suitably serve to illustrate the nature of the problems and difficulties encountered and which may be obviated by a device as embodied herein. Hence, for the purpose of illustration without intent of limitation, the novel device embodied herein is described with particular emphasis on its utility to rotary drum filters.

Rotary drum filters generally embody a large cylindrical drum mounted for rotation about a horizontal axis with the cylindrical periphery of the drum being provided with a suitable mesh work supporting a filtering medium (e. g., a filter cloth). In use, the filter drum is partially immersed in the slurry to be filtered and as the drum rotates, its lower portion is always immersed in the slurry. As a portion of the drum passes through the liquid, suction is applied to the interior of the submerged chamber thereby effecting deposition of a filter cake of solid material on the filtering medium and passage of filtrate through said medium. Upon continued rotation of the drum, the filter cake usually is subjected to the action of washing sprays, is dried by suction, and air-blown to loosen the cake at positions above the surface of the slurry. Removal of the filter cake is then effected by use of suitable means (e. g., a scraper blade) which scrapes off the filter cake, lifts the cake from the drum, and deposits it into a suitable receiving receptacle. In order to hold the filtering medium securely in place upon the drum and to protect it from the abrading action of the scraper blade, a wire or cable is tightly wound in helix form on the filter medium. The wire helix is usually anchored at one end and the other end attached to a tension spring or similar device for keeping the wiring taut. In use of filters wound in this manner, the wiring has a tendency to stretch or elongate and, even by use of a tension spring as aforesaid, considerable difficulties are encountered in that, with the considerable length of wiring ordinarily used, the stretch or elongation of the wire soon reduces the initial tension from the take up spring to a point where the wire becomes loose, resulting in faulty operation of the filter and necessitating frequent adjustment of the wire tightening means. Such shutdowns are undesirably time consuming and expensive and are particularly so that, to obtain access to the take-up device and wiring, it is generally necessary to dismantle a portion of the casing usually employed for housing the filter. As is more fully described hereinafter, the present invention provides a novel take-up or tensioning device that automatically and in controlled manner provides desired tension on a wiring while overcoming problems and difficulties as afore-discussed and which, for purposes of illustration, have been described with particular reference to rotary drum filters.

It is therefore an object of this invention to provide an improved means for maintaining desired tension on wire, cable, cord, or the like. Another object is to provide a compact and efficient take-up device for automatically providing desired tension on a wiring on a cylindrical drum. It is a further object to provide a novel improved device adapted for automatic operation to maintain desired tension on a helical winding and more specifically, on such a winding on the cylindrical peripheral portion of a cylindrical drum. It is still another object to provide a novel tensioning device, as embodied herein, in assembly with a cylindrical drum equipped with a winding for automatically maintaining desired tension on said winding. These and other specific objects and advantages of the invention will be apparent from the following description.

The present invention relates to an apparatus, adapted for maintaining tension on a wire or the like, comprising in combination a wire-fastening means adapted to secure a free end of a wiring to be maintained under tension, said wire-fastening means being adapted to move in a wire tensioning direction upon application of force thereto, means adapted to prevent movement of said wire-fastening means in a non-tensioning direction, and means operable at predetermined intervals adapted to transmit force to said wire-fastening means. Thus, the apparatus may comprise a wire-fastening means as aforesaid, a driven means adapted to actuate said wire-fastening means, and driving means adapted to drive said driven means through a yieldable connection adapted to exert a predetermined force upon said driven means. In a specific aspect, the invention comprises an improved tensioning device capable of use in connection with an apparatus containing a wiring to closely and accurately maintain desired tension on the wiring for indefinitely long periods of time without necessity for making frequent and periodic adjustments. In use, the device is adapted to provide such desired tension by applying, in an automatic manner, corrective forces at frequent and/or otherwise predetermined intervals during operation of the apparatus to which it is applied. Hence, and in illustration of this function, the device when used on apparatus or members thereof moving in a repeated cycle may be adapted to correct, during each cycle or at other intervals, any incremental losses in tension that may occur in the wiring. Thus, in one embodiment adapted for application to a drum filter of the type described herein or to other rotary apparatus carrying a wire or like means to be closely controlled with respect to tension thereof, the device comprises a spindle or spool on which the end of the wire or the like means is attached, said spindle or spool being adapted to be rotated in a direction to wind the wiring thereon by force applied through a yieldable (e. g., resilient) means set to deliver predetermined force to said spindle or spool when actuated by movement of said apparatus, and means for periodically actuating said yieldable means during operation of the apparatus. In a still more specific aspect, the novel device comprises a yieldable tensioning means adapted to be set at a predetermined tension, a winding means adapted to secure a wiring and rotatable in a direction to wind the wiring, driven means responsive to the predetermined tension set by said tensioning means to apply to said winding means a force sufficient to maintain said wiring under a predetermined tension, means adapted to periodically actuate said tensioning means whereby, upon loss in tension by said wiring, said driven means is actuated during said periodic actuation of the tensioning means to apply to said winding means a force sufficient to restore the wiring to predetermined tension.

The device of this invention may be more readily understood from the following description of the accompanying drawings which have been chosen for illustrative, but not limitative, purposes and in which like reference characters designate the same or similar parts of the various views. In the drawings, Figure I is an end view of a specific embodiment of the novel device illustratively shown mounted on the drum head of a rotary drum;

Figure II is an end view of the embodiment shown in Figure I showing the device in various positions assumed during operation in specific assembly with a rotary drum;

Figure III is a fragmentary sectional side elevation of the embodiment shown in Figure I, Figure IV is an end view of a specific embodiment of an adjustable lever member suitable for use in practice of this invention, and Figure V shows in side elevation the lever members illustrated in Figure IV.

Referring to Figures I and III, illustrating a specific embodiment of this invention, the device shown comprises a spindle 15 having rotatably mounted thereon winding drum 16 and ratchet wheel 17 which as shown are integral but may, if desired, be separate members otherwise rigidly affixed to each other. Also rotatably mounted on spindle 15 is a driving means, illustrated by driving lever arm 18, which preferably carries a roller 22 as shown and a driven means, illustrated by driven lever arm 19, which carries a ratchet-engaging means, illustrated by moving ratchet dog 25, adapted to engage the ratchet teeth of ratchet wheel 17 and, upon application of force to ratchet dog 25, to turn winding drum 16 through ratchet wheel 17 in a wire winding direction. Another ratchet engaging means, illustrated by fixed ratchet dog 24, is positioned in a manner adapted to engage the ratchet teeth of ratchet wheel 17 at positions circumferentially remote from ratchet dog 25, and to hold the ratchet wheel in a position determined by the force applied to the ratchet wheel by ratchet dog 25. As shown, lever arm 18 and lever arm 19 are maintained in spaced-apart relationship by a yieldable member, illustrated by adjustable tension spring 27, one end of which is affixed to lever arm 18 by stud 23 and the other end to lever arm 19 through adjusting bolt 20 carried by support 21 integral with or otherwise rigidly affixed to lever arm 19. A suitable recoil means, illustrated by recoil spring 28, is provided for lever arm 18, and, as shown, such a recoil spring has one end thereof affixed to lever arm 18 by means of stud 23 and its other end secured by a rigid support shown by stud 29.

For the purpose of facilitating description of the operation of a device as illustrated in Figures I and III, the embodiment is shown in assembly with rotary drum 32, the cylindrical peripheral portion of which is helically wound with wire 11, the free end of which is passed over sheave 12 and secured to winding drum 16. For purposes of illustration, rotary drum 32 is mounted for continuous rotation in a clockwise direction upon supporting trunnions 33 by any suitable driving means (not shown). In Figure III, the device is shown rigidly affixed to drum head 10 by having spindle 15 affixed by welds 32a to a suitable support plate 13 bolted to the drum head by bolts 14. Rotary drum 32 is shown housed by casing 31 to which a stop member, illustrated by block 26, is affixed in the rotative path of roller 22. Block 26, preferably comprised of a non-sparking metal, is positioned in a manner whereby, upon contact thereof by lever arm 18, contact between the block and lever arm will be maintained for a portion of a complete revolution of the rotary drum.

It is apparent that in the assembly illustrated in Figures I and III, the device as a whole will be carried in a circular path by the drum head as the drum revolves. With the device mounted on the drum head as illustrated, and the free end of wire 11 secured to winding drum 16, the tension on tension spring 27 is adjusted by means of adjusting bolt 29, the tension to which said spring 27 is adjusted being sufficient for ratchet dog 25, through lever arm 19, to apply to ratchet wheel 17 a force sufficient for said ratchet wheel to rotate winding drum 16 in a wire winding direction (counter-clockwise) until the latter winds up wiring 11 to desired tension and is held in such a position by means of fixed ratchet dog 24 which engages ratchet wheel 17. After the device has been adjusted as aforesaid, the rotary drum may be placed in its normal use. During each complete revolution of the drum, roller 22 contacts fixed block 26 which is adapted as aforesaid to maintain such contact for a predetermined interval, thus detaining and pivoting the outer portion of arm 18 at block 26 for a portion of a complete revolution of the rotary drum. If, during operation of the rotary drum, the tension in the wiring has decreased in between the intervals at which lever arm 18 is maintained in contact by block 26, detention of arm 18 against its freely rotative movement causes lever arm 18 to pull on lever arm 19 through spring 27 and rotate ratchet wheel 17 (through dog 25) and the winding drum 16 to restore the tension to the wire. Fixed ratchet dog 24 then maintains the position of the winding drum against reverse movement. When the wiring has been restored to desired tension as just described and as the drum continues to rotate, the angle made by lever arms 18 and 19 increases, and the spring 27 expands until arm 18, due to increase of the distance between the fixed block 26 and the spindle 15 as the latter follows a circular path with rotation of the drum, clears block 26 whereupon the device assumes its predetermined setting and lever arm 18 again freely rotates with the device. The recoil of lever arm 18 upon release by block 26 is taken up by recoil spring 28. Upon the next and each succeeding revolution of the drum, lever arm 18 again contacts fixed block 26 whereby the device functions as aforesaid to restore to the wiring any loss in tension that may have occurred.

In the event that the wiring has not lost any appreciable tension in between intervals at which lever arm 18 contacts block 26, tension spring 27 will yield upon detention of arm 18 by the block and the angle made by the lever arms will increase as before, but without driving the ratchet wheel and winding drum. As aforesaid, and upon release of the lever arm 18 by block 26, the device assumes its predetermined relationship and again rotates freely with the drum head.

In further description of the device in operation, reference is made to Figure II wherein the detailed portion (unprimed reference characters) illustrates the device in adjusted position and freely rotating with the drum head. Upon continued rotation of the drum, the device approaches block 26 and, as shown in Figure I, lever arm 18 makes initial contact (through roller 22) with block 26 whereupon arm 18 is detained as stated above and the device operates to restore the wiring to desired tension if appreciable tension loss has occurred. Figure II illustrates (by the portion thereof indicated by primed reference characters) the position assumed by the lever arms just before release of lever arm 18', showing the increased angle between the arms permitted by yielding of tension spring 27. Upon release of lever arm 18' by block 26, the device assumes its normal predetermined setting shown by the detailed portion of Figure II whereby lever arm 18 again freely rotates with the drum head and again makes contact with block 26 upon continued revolution of the drum as aforestated.

It is apparent from the foregoing description of the invention that the device embodied herein provides a simple and effective means for maintaining desired tension on a wiring and obviates problems and difficulties as aforediscussed and usually encountered with apparatus containing a wiring on which maintenance of desired tension is important. As is further apparent from the foregoing description, and especially with respect to use thereof on rotary drums, the novel device enables maintenance of accurate and close control of the tension on the winding thereof as the device may be adapted to operate on every revolution of the drum or at otherwise frequent predetermined intervals. Moreover, and as another important aspect, the automatic nature of the device provides a distinct advantage in that the necessity for frequent shutdowns, coupled with dismantling of portions of the apparatus, casings therefor, etc., such as is necessitated by use of certain prior art devices, is either obviated or materially decreased.

Although the present invention has been described in conjunction with certain preferred embodiments thereof, those skilled in the art will readily recognize that variations and modifications can be made and that such variations and modifications are to be considered within the purview of the specification and the scope of the appended claims. Thus, it should be understood that although a tension spring 27 and recoil spring 28 have been shown in the drawings, means such as hydraulic mechanisms, other resilient members, etc. may be used in place thereof. Moreover, and although lever arm 18 is shown as carrying roller 22, it should be understood that roller 22 illustrates a preferred and not limitative embodiment, as suitable means other than a roller may be employed or, if desired, may even be dispensed with whereby the lever arm itself is adapted to make direct contact with the stop member. Furthermore, and although block 26 has been shown as a fixed block, the invention embodies use of such a block that is adjustable for setting to a predetermined position with respect to lever arm 18 or roller 22, or, if desired, a driving lever arm that is in itself adjustable may be used so as to provide for compensation for wear on the fixed block and/or roller or to adjust the retention of the driving lever arm by the fixed block. Although the art is aware of and will undoubtedly appreciate that any of many known adjustable lever means may be used, an illustration of a suitable adjustable lever arm is shown in Figures IV and V illustrating a lever arm comprising two overlapping sections 34 and 36, section 34 having a recessed portion 40 adapted to receive section 36 in longitudinally slidable relationship therewith and a threaded opening 37 and section 36 being provided with slot 35. The two sections are held in adjustable relationship by bolt 38 carrying retaining washer 39.

It should also be apparent to those skilled in the art that although the device has been described herein with particular emphasis on its application to a rotary drum wherein the device itself is rotated and a fixed stop means (block 26) is employed for effecting periodic contact with lever arm 18, the device is also adapted to function in desired manner in application to stationary apparatus that contains a wiring to be maintained under desired tension. In illustration thereof, and assuming that drum 32 illustrated in Figure III is not of the rotary type, but operates to perform a desired function while stationary, and with the device mounted thereon in the manner illustrated in the drawings, it is within the scope of this invention to provide a stop member that is rotated or otherwise adapted to contact lever arm 18 at predetermined intervals and maintain such contact in the manner aforediscussed whereby the device operates to take up losses in tension in the wiring.

I claim:

1. In apparatus for maintaining tension in a wire by means of a reel rigidly secured against unwinding but free to be rotated in a wire-tensioning direction, the improvement adapted to maintain an initial degree of tension in said wire comprising a driver, resilient means of predetermined loading characteristics adapted to couple said driver and said reel in force-transmitting relationship during a driving stroke and means to uncouple same during a return stroke, said driver being adapted for limited movement through successive driving strokes of equal length to apply force at each such stroke to said reel in a wire-tensioning direction through said resilient means, whereby said reel will be rotated during such driving strokes to restore tension if tension has been lowered in the wire below the initial degree but will not be rotated during such driving stroke if there has been no reduction of tension in the wire.

2. In an apparatus as defined in claim 1 in which the improvement comprises, as an additional element, means for periodically moving the said driver through driving strokes of equal length.

3. An apparatus for maintaining tension on a wire comprising wire-fastening means adapted for unlimited movement in a wire-tensioning direction, driving means for moving said wire fastening means in a wire tensioning direction comprising a driving member, a driven member and a resilient force-transmitting coupling connecting said members together, said driving member adapted for free movement in relation to said wire-fastening means in a power stroke loading said coupling and in a return stroke unloading said coupling, means for locking said driven member to said wire-fastening means during the power stroke and actuated by said driving means to release same during the return stroke, means associated with said driving means for adjusting the force applied to said wire fastening means during the power stroke and releasable locking means adapted to prevent reverse movement of said wire-fastening means during unloading of the resilient coupling in said return stroke and to release during such power stroke thus permitting the said wire-fastening means to be moved in a wire tensioning direction, whereby any reduction in tension in the wire may be restored thereto periodically by loading of the resilient coupling in the power stroke and predetermined tension may be maintained on the wire during unloading of the resilient coupling in the return stroke.

4. An apparatus, as defined in claim 3, in which the driving member is adapted to move a fixed predetermined distance during each power stroke.

5. An apparatus, as defined in claim 4, in which the stated means for adjusting the force applied to the wire fastening means during the power stroke comprises a member for varying the loading characteristics of the resilient coupling.

6. An apparatus, as defined in claim 5, in which the resilient coupling is an adjustable spring.

7. A rotary drum-type filter having a wire under tension spirally wound on its filtering surface and carrying on at least one of its drum heads wire-tensioning apparatus secured for rotation with the filter, said wire-tensioning apparatus comprising wire-fastening means securing an end of said wire and adapted for unlimited movement in a wire-tensioning direction but rigidly secured against movement in an opposite direction, driving means movable in a power stroke and a return stroke, resilient force-transmitting means coupling said driving means with said wire-fastening means during the power stroke and means stationary with respect to the said wire-tensioning apparatus adapted upon rotation of the filter drum to engage with and force said driving means through its power stroke and to release the same for its return stroke, whereby any loss of tension is periodically restored to the wire during operation of the filter through loading of said resilient force transmitting means and tension is maintained in the wire during unloading of said resilient force transmitting means.

8. A rotary drum-type filter as defined in claim 7 in which the stated wire-tensioning apparatus comprises, in addition, a driven member engaging the stated wire-fastening means and coupled with the stated driving means through the resilient force-transmitting means.

GEORGE W. NIGH.

References Cited in the file of this patent

UNITED STATES PATENTS

| Number | Name | Date |
|---|---|---|
| 362,600 | Boyd | May 10, 1887 |
| 993,409 | Roderick | May 30, 1911 |
| 1,023,972 | Starnes | Apr. 23, 1912 |
| 1,206,019 | Moore | Nov. 28, 1916 |
| 1,855,641 | Marschall et al. | Apr. 26, 1932 |
| 2,145,933 | Kehrer | Feb. 7, 1939 |
| 2,180,354 | Frazier | Nov. 21, 1939 |
| 2,240,814 | Taylor | May 6, 1941 |
| 2,300,166 | Nowak | Oct. 27, 1942 |
| 2,443,986 | Little | June 22, 1948 |

FOREIGN PATENTS

| Number | Country | Date |
|---|---|---|
| 20,657 | Great Britain | 1912 |
| 193,308 | Germany | May 5, 1906 |